United States Patent [19]
Schurger et al.

[11] 3,951,472
[45] Apr. 20, 1976

[54] BOX WITH DOUBLE ROW TRACK CARRIERS

[75] Inventors: Rainer Schurger, Schwanfeld; Armin Olschewski, Schweinfurt; Erich Burkl, Stammheim; Lothar Walter, Schweinfurt, all of Germany

[73] Assignee: SKF Industrial Trading and Development Company, B.V., Jutphaas, Netherlands

[22] Filed: Oct. 30, 1974

[21] Appl. No.: 519,335

[30] Foreign Application Priority Data
Dec. 19, 1973 Germany............................ 2363033

[52] U.S. Cl.................................................. 308/6 C
[51] Int. Cl.² .......................................... F16C 29/06
[58] Field of Search............... 308/6 R, 6 C, 185, 72

[56] References Cited
UNITED STATES PATENTS
3,844,629  10/1974  Haines ................................ 308/6 C Primary Examiner—M. H. Wood, Jr.
Assistant Examiner—Gene A. Church
Attorney, Agent, or Firm—Daniel M. Rosen

[57] ABSTRACT

A ball box construction compensating for load differentials in adjacent rows of row pairs of recirculating balls wherein the dual row track carrier supporting the ball box in a housing is supported at its center but is less firm on the opposite face sides including each row of a row pair.

10 Claims, 3 Drawing Figures

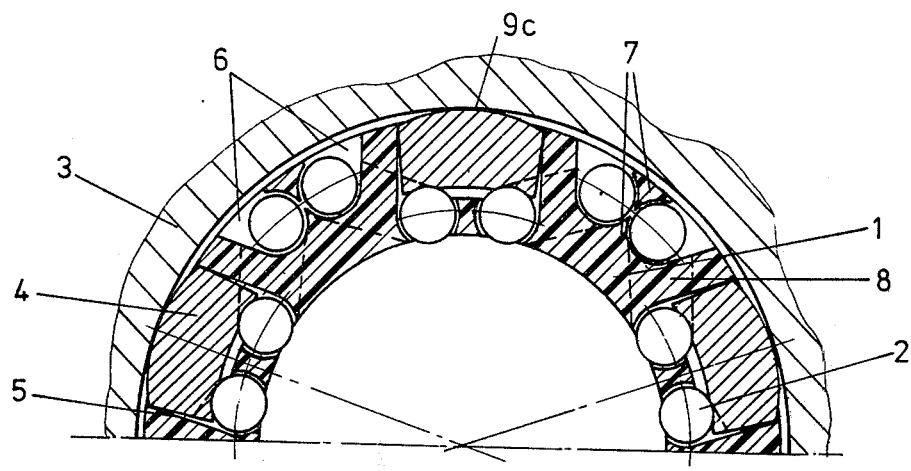
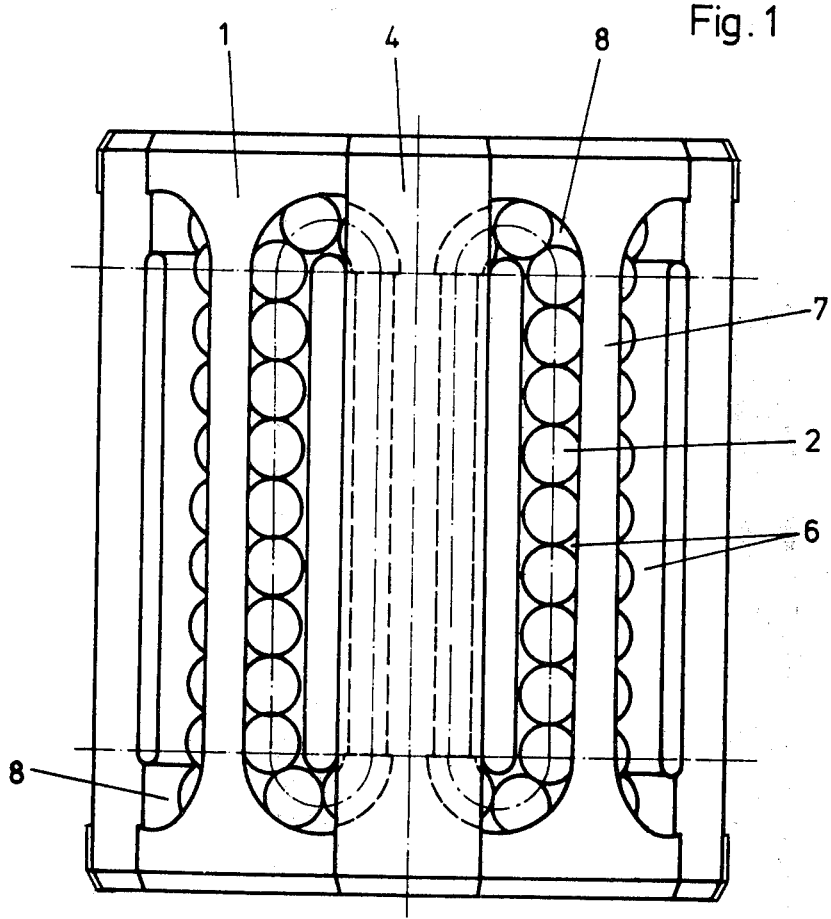

BOX WITH DOUBLE ROW TRACK CARRIERS

THE INVENTION

The invention relates to bearing structures, and particularly to a ball box with endless ball races leading into a cage, and wherein the balls in the ball races roll in pairs in the loaded zone on common track carriers.

Ball boxes with endless ball races arranged in double rows are known. In the loaded zone, balls radially protrude from the cage in both inward and outward directions, rolling on common row tracks arranged in pairs. The tracks are arranged in the bore of a housing of similar structure. In such a construction, the balls of each of the row tracks may be subjected to different loads in accordance with load variations. As a result, the ratio of bearing contact area to total area decreases, the individual row tracks become overloaded, and the ball box must be replaced after a relatively short operational life.

It is therefore the prime object of the present invention to provide an improved bearing structure.

It is another object of the invention to provide a ball box with an improved running behavior, particularly wherein variations in load are compensated.

In accordance with the foregoing objects, the present invention, in a ball box of the kind described, solves the load variation problem by providing the outer diameter of the row track carrier, used in the cage, to be larger in cross-section in the middle area between the row tracks, than in the range of the row tracks.

The advantage of the foregoing structure is that the row track carriers are loaded only centrally, and will exhibit a springy characteristic by giving with variations in the load in the range of the row tracks.

According to another characteristic of the invention, the row track carriers are supported in a manner such that they go through a tilting motion in the circumferential direction. Also, in such a construction, different loads will be uniformly divided over the row tracks since the row track carriers are each themselves adjustable according to the respective loads thereon.

The advantage of the springy construction is added to the advantage of the tilting motion by providing a construction further in accordance with the invention wherein the row track carriers are constructed of an essentially U-shaped plate with uniform wall thickness and having projections stretching in the circumferential direction for absorbing the variations imposed upon the row tracks.

Other objects, characteristics and advantages of the invention will become more evident from the following more detailed description taken in connection with the appended drawings, wherein:

FIG. 1 shows a cross-section through the upper half of a preferred embodiment.

FIG. 2 illustrates a view from above of the ball box shown in FIG. 1; and

Figure 3:
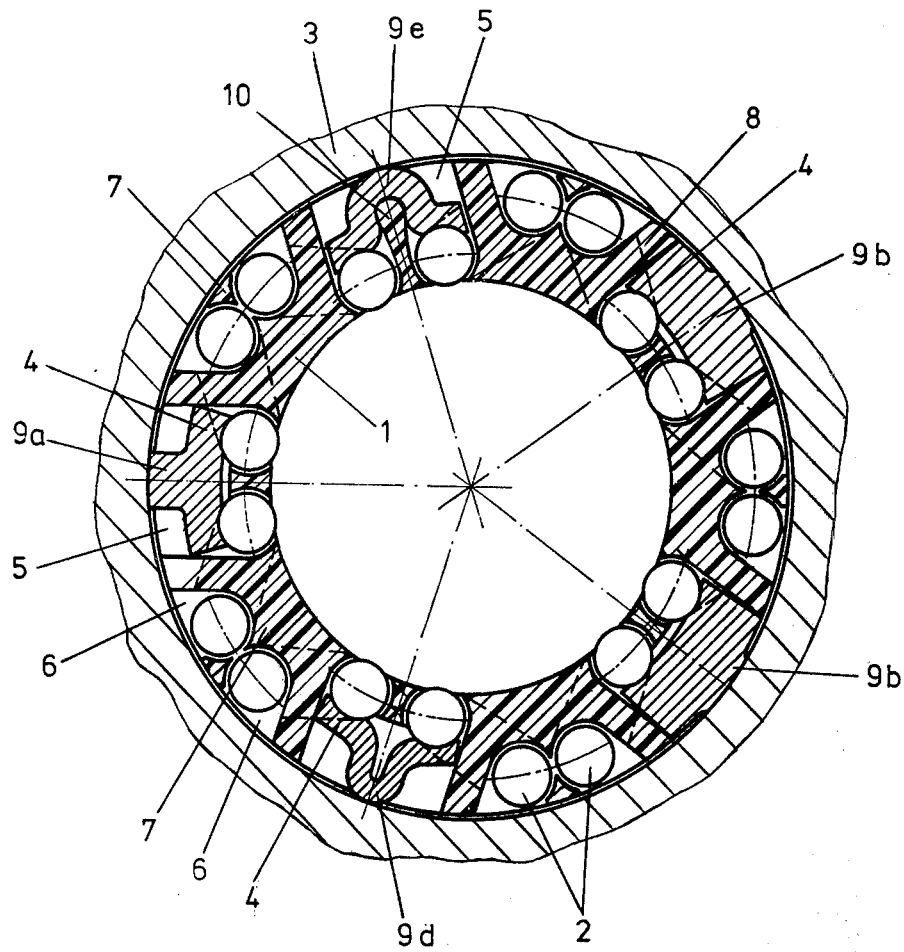
FIG. 3 is a diagrammatic view of several variations of the row track carrier structure in accordance with the invention and which for the sake of simplicity are shown jointly built into a ball box.

Referring now to FIGS. 1 and 2, several endless rows of balls 2 are set in pairs in a cage 1, which cage may be of a suitable plastic material, or the like. In the loaded zone, the balls 2 protrude radially inward out of the cage 1, in order to contact an axle (not shown) which is slidable relative to the cage 1. For the transmission of loads from the axle to a housing 3, steel row track carriers 4 are provided in the zone under load, which carriers are supported in the bore of the housing 3. Each of the row track carriers 4 placed in the openings 5 of the cage 1 is provided with two axially running row tracks, placed next to each other, for accommodating the rows of balls.

In the loadfree zone, return channels 6 for the balls 2 are provided in the area of the outer circumference of the cage 1. This area is likewise designed with the channels in pairs adjacent to each other and running in the axial direction. Each two return channels 6 are separated from one another by flanges 7 such that the two rows of balls adjacent to each other are separated only by a very slight distance. In this way many endless rows of balls can be provided, thereby increasing the carrying capacity of the ball box.

In the area of one face of the ball box the rotating balls 2 are transferred into deviation channels 8 from the loaded zone to the load-free zone. At the other end of the ball box, the balls 2 are also led through deviation channels 8 from the loaded zone into the load-free zone.

In accordance with the invention, several embodiments can alternatively be provided for the row track carriers 4. For ease of illustration, several alternative embodiments are shown in a single ball box in FIG. 3, whereas a single preferred embodiment is shown in FIG. 1. Thus, as shown in FIGS. 1 and 3, the row track carrier 4 in the cage 1 may be made from a massive molded piece, which in the axially running middle area 9a or 9b (FIG. 3) is thicker than in the area of the row tracks. Thus, the part that carries the row tracks will exhibit a springy give during variations in the load. Loads are transferred only in the center of the row track carrier 4 by the balls 2 acting through the row track carrier 4 to the housing 3.

Alternatively, in accordance with a preferred embodiment of the invention, the row track carrier center 9c may be shaped as shown in FIG. 1, such that the cross-section in the area of the outer diameter is a curve, whereby the radius of that curvature is smaller than the radius of the curve defining outer diameter of the cage 1. In such a construction the row track carrier 4 functions as a rocker so that variations in the load are likewise compensated for.

Besides construction as a massive part, the row track carriers 4 may also be formed of an essentially U-shaped plate of uniform wall thickness as shown in FIG. 3. In this embodiment the row track carrier 4, in the center part 9d is also larger than in the area of the row tracks. As a result, the row track carrier 4, with its center part 9d in the bore of the housing 3, can support itself with a tilting motion and additionally exhibit the springy give characteristic.

Finally, it is possible to mount the row track carrier 4, which is essentially a U-shaped plate, with its center part 9e on a flange 10 of the cage. Here, the carrier 4 can tilt about the flange 10. The flange 10 also serves to separate the two adjacent rows of balls in the load zone.

All of the row track carriers 4 can be placed singly in the openings 5 in the cage 1, or the row track carriers 4 may be connected together in the area of their front ends and pushed over the cage 1 for installation.

Other variations, alternatives and modifications within the scope of the invention will be apparent to those skilled in the art.

What is claimed is:

1. A ball box positioned in a housing and having a central load zone, and recirculating balls alternating between said central load zone and a load-free zone, comprising a cage, a plurality of endless rows of balls arranged in said cage to roll in said load zone in pairs of row tracks, and a plurality of row track carriers each positioned to support the balls in a pair of adjacent row tracks in said cage, said row track carrier extending radially outwardly with respect to said ball box in the region between the corresponding row tracks to a greater extent than in the regions radially aligned with said corresponding row tracks, whereby each said row track carrier provides a firm support on one side thereof against said housing in the center thereof and a less firm support on the other side thereof in the areas adjacent said centers and corresponding to the position of each said row track on said other side of said row track carrier, said less firm support allowing the rollers in said row tracks to shift radial positions in accordance with load variation in said central load zone.

2. A ball box according to claim 1, wherein each said row track carriers, in said center thereof in the direction of the circumference of said ball box, is supported for tilting movement.

3. A ball box according to claim 1, wherein each said row track carrier includes a substantially U-shaped plate with uniform wall thickness having flanges extending in the direction of the circumference of said ball box for supporting the balls in the corresponding said row tracks.

4. A ball box according to claim 3, comprising a flange separating two adjacent rows of balls wherein said row track carrier is supported on said flange in the center part of said row track carrier between adjacent rows of balls for a tilting motion.

5. A ball box according to claim 1, wherein the center area of said row track carrier is curved over its cross-section in the area of its outer diameter, said curve having a radius which is smaller than that of the outer diameter of said cage.

6. A ball box comprising an endless row of balls and a cage, said balls being mounted in said cage for recirculating movement between a load zone and a no load zone in pairs of rows, a plurality of row track carriers, each pair of rows defined by a pair of row tracks in said load zone formed in the inner surface of separate row track carriers being positioned about the circumference of said ball box cage, said row track carrier having an outer surface supporting said ball box within a housing by extending beyond the circumference of said ball box cage, the outer diameter of each said row track carrier outer surface in the axially extending center area between the row tracks exceeding that of the row track carrier outer surface in the area of said row tracks, said row track carrier thereby exhibiting a correction characteristic compensating for load differentials in adjacent rows of said pairs of rows.

7. A ball box according to claim 6, wherein each said row track carriers, in said center thereof in the direction of the circumference of said ball box, is supported for tilting movement.

8. A ball box according to claim 6, wherein each said row track carrier comprises a substantially U-shaped plate with uniform wall thickness having flanges stretching in the direction of the circumference of said ball box for supporting balls in said row tracks.

9. A ball box according to claim 8, comprising a flange separating two adjacent row tracks, wherein said row track carrier is supported on said flange in the center part of said row track carrier between adjacent rows of balls for a tilting motion.

10. A ball box according to claim 6, wherein the center area of said row track carrier is curved over its cross section in the area of its outer diameter, said curve having a radius which is smaller than that of the outer diameter of said cage.

* * * * *